E. U. AMES.
MECHANICAL MOVEMENT.
APPLICATION FILED APR. 2, 1915.
1,155,191.
Patented Sept. 28, 1915.
2 SHEETS—SHEET 1.
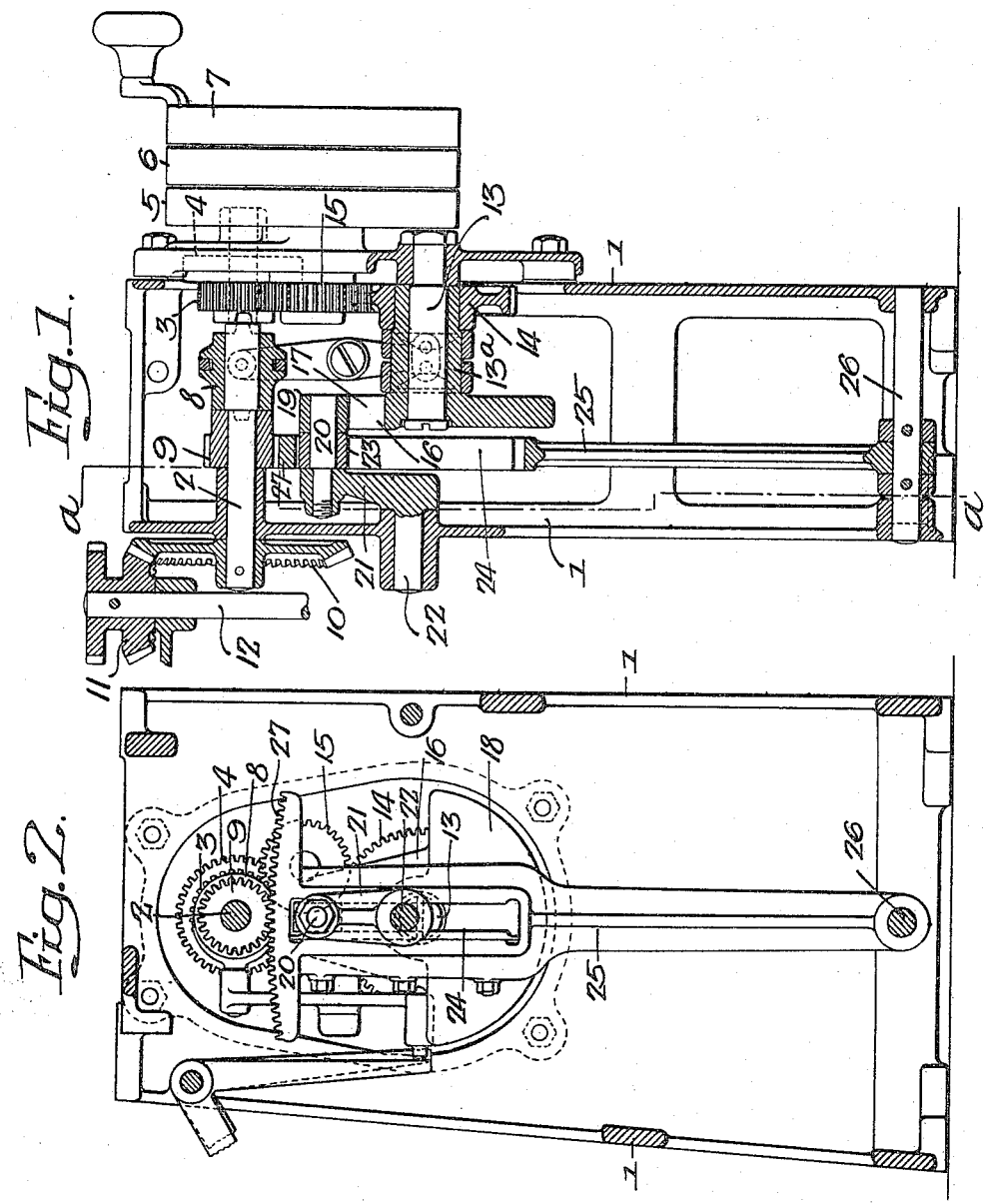
Inventor:—
Elmer U. Ames.
by his Attorneys
Howson & Howson E. U. AMES.
MECHANICAL MOVEMENT.
APPLICATION FILED APR. 2, 1915.
1,155,191.
Patented Sept. 28, 1915.
2 SHEETS—SHEET 2.
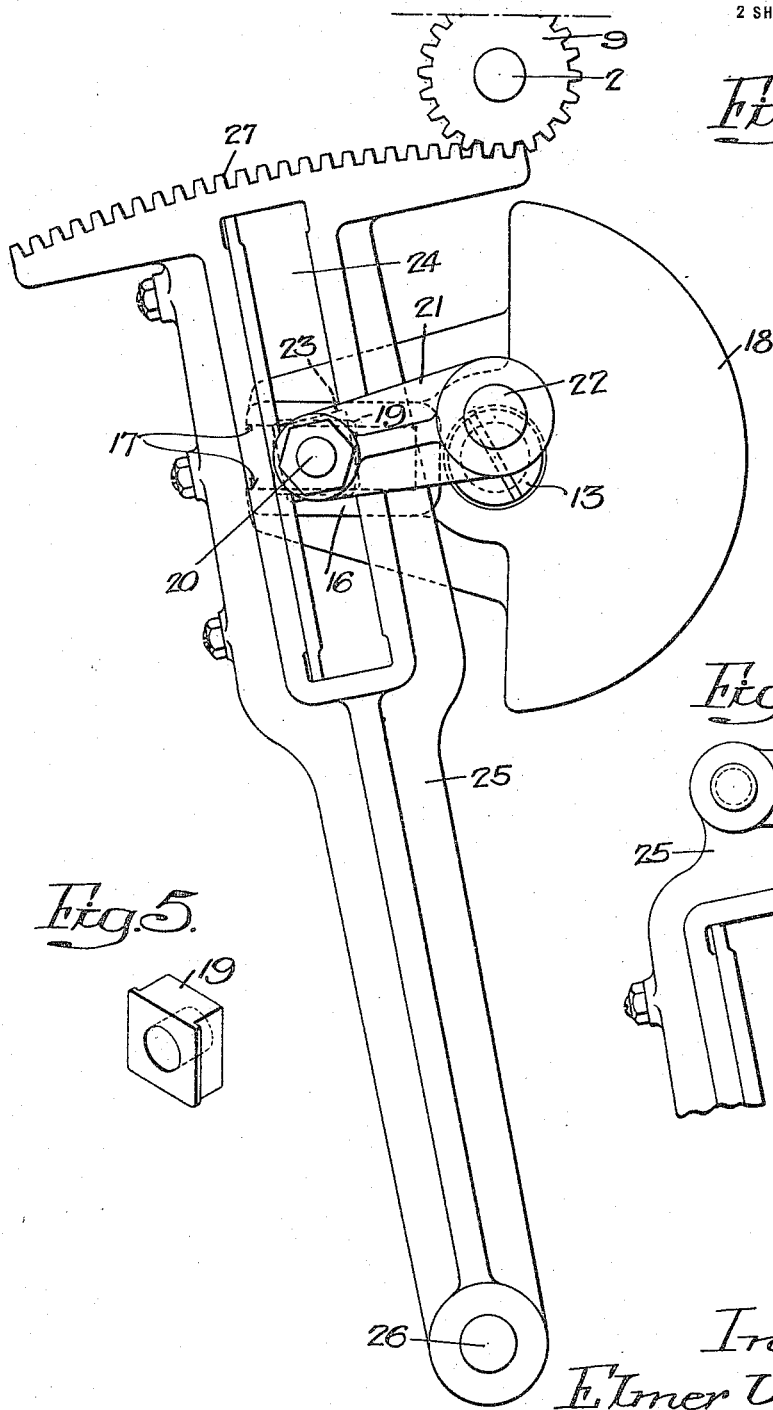

UNITED STATES PATENT OFFICE.

ELMER U. AMES, OF PHILADELPHIA, PENNSYLVANIA, ASSIGNOR TO H. BRINTON COMPANY, OF PHILADELPHIA, PENNSYLVANIA, A CORPORATION OF PENNSYLVANIA.

MECHANICAL MOVEMENT.

1,155,191.  Specification of Letters Patent.  Patented Sept. 28, 1915.

Application filed April 2, 1915.  Serial No. 18,801.

*To all whom it may concern:*

Be it known that I, ELMER U. AMES, a citizen of the United States, residing in Philadelphia, Pennsylvania, have invented the Mechanical Movement of which the following is a specification.

One object of my invention is to provide mechanism for changing rotary to reciprocating motion which shall have its parts so arranged as to move the reciprocated member at the same speeds in the corresponding parts of its opposite strokes, the invention contemplating a relatively simple and efficient combination of parts for accomplishing the above desired end.

These objects and other advantageous ends I secure as hereinafter set forth, reference being had to the accompanying drawings, in which, Figure 1 is a side elevation, partly in section, illustrating the preferred form of my invention as designed for application to a knitting machine; Fig. 2 is a vertical section on the line *a—a*, Fig. 1; Fig. 3 is an enlarged side elevation of the mechanical movement constituting my invention; Fig. 4 is a fragmentary elevation of a slightly modified form of part of my device; and Fig. 5 is a perspective view of one of the sliding blocks.

In the above drawings 1 represents a suitable supporting frame in which is journaled a main shaft 2 loosely carrying gears 3 and 4 of which the latter is driven from a shaft having on it fast pulleys 6 and 7 and a loose pulley 5, there being an operating handle projecting from the side of said pulley 7. By means of a clutch member 8 slidable on the shaft 2, this latter may be connected to a gear 3 or to a gear 9, there being also fixed to said shaft 2 a beveled gear 10 which meshes with a beveled pinion 11 fixed to a shaft 12, designed in the present instance to operate a knitting machine.

In order that this latter shaft may be alternately driven in opposite directions as required at certain times in the operation of a circular knitting machine, I provide mechanism whereby the continuous rotary movement of the gear 3 shall be changed into a rotary movement alternately in opposite directions of the gear 9. For this purpose I mount on the frame a stud or fixed spindle 13 on which is rotatably mounted a sleeve or hollow shaft 13ª to which is fixed a gear 14 driven through an intermediate gear 15 from the gear 3. Also fixed to this sleeve is a crank 16 having a radial slot 17 and counter-balanced by a weight 18. Mounted in the slot 17 is a block 19 rotatably mounted on a pin 20 fixed to a second crank 21, which in the case illustrated, is shown as integral with a third spindle 22 so journaled in the frame 1 that its center line is a definite distance above the center line of the sleeve 13ª carrying the crank member 16. On the pin 20 between the two cranks is mounted a second block 23 slidable in a slot 24 which extends radially of an elongated arm 25 mounted to oscillate upon a pivot spindle 26 journaled in the lower part of the frame 1. The outer end of this arm 25 carries a segmental rack 27 which meshes with the teeth of the gear 9.

As will be understood by those skilled in the art, if the pin 20 was fixed in the crank 16, the rotation of the sleeve 13ª would cause the arm 25 to oscillate on the pivot 26 as the block 23 moved up and down in the head 24, although the stroke of said arm in one direction would be caused by less than half a revolution of said crank member, while the stroke in the opposite direction would require the remainder of the crank revolution, with the result that the speed of rotation of the gear 9 at different points of its cycle of movement in one direction would be different from its speed at the corresponding parts of its cycle of movement in the opposite direction. By my invention, at those times when the crank member 16 is moving in the lower part of its circle of revolution, the crank 21 causes the pin 20 and hence the block thereon, to move nearer the center of the shaft 13 and then to recede therefrom, so that the tendency of the crank member 16 to cause a certain variation of the speed of movement of the arm 25, while the former is turning through the lower half of its circle of movement, is counteracted by the movement of the pin 20 toward the shaft 13. On the other hand, when moving through the upper part of its path, the variation in the speed of movement of the arm 25 due to the sliding of the block 23 in the outer part of the slot 24, is counteracted by the movement of the block 19 by the crank 21 in the outer part of the slot 17, where it is farther from the center of the shaft 13. As a result of this arrangement of parts, the arm 25 is moved with the same speed at any given part of its stroke in one direction as that which it has at the corresponding point of its stroke in the opposite direction, and thus obviates uneven work by the machine connected to the shaft 12. In the apparatus illustrated, when the clutch member 8 is thrown into engagement with the clutch member carried by the gear 3, the shaft 2 and hence the shaft 12 connected thereto is driven continuously in one direction. When, on the other hand, said clutch member is thrown to engage the clutch member forming part of the gear 9, this latter is rotated alternately in opposite directions by the apparatus above described;—that is to say, the sleeve 13ª is turned through the gears 3, 15 and 14, thus rotating the crank member 16 and oscillating the arm 25, which through its rack 27 turns the gear 9 alternately in opposite directions.

Obviously it is immaterial how the power is transmitted from the oscillating arm 25, since the machine to be driven may be connected to it in any suitable manner other than by the rack 27 and gear 9. As illustrating such a modification I have shown in Fig. 4 a rod 30 pivoted to the upper end of the arm 25 and by it given a reciprocating motion such as required in certain types of printing presses, flat knitting machines, etc.

I claim:—

1. The combination of a driving crank; an arm oscillated thereby and pivotally held from other than oscillatory movement; mechanism driven from said arm; and means for causing the speed of said arm to be the same in corresponding parts of its strokes in opposite directions.

2. The combination of two eccentrically mounted cranks; a pin fixed to one crank and slidably engaging the other; an oscillatory member also engaged by said pin; means for driving one of the cranks; and driven mechanism connected to the oscillatory member.

3. The combination of a driving crank having a radial slot; a second crank mounted eccentrically to the first crank; a pin carried by the second crank and slidable in the slot of the first crank; a pivotally mounted arm having a radial slot for the reception of the pin; and driven mechanism connected to said arm.

4. The combination of two eccentrically mounted cranks; a pivotally mounted arm having a radial slot and operative between the cranks; a pin fixed to one of the cranks extending through the slot of the arm and slidably engaging the other crank; means for turning one of the cranks; and mechanism driven from the arm.

5. The combination of a crank having a radial slot; a second crank mounted eccentrically of the first crank; an oscillatory arm; a pin fixed to one of the cranks; two blocks mounted on the pin and slidable in the slots of the other crank and of the arm respectively; means for turning the slotted crank; and mechanism driven by the oscillatory arm.

6. The combination of a driving crank; an oscillatory arm; mechanism actuated from said arm; with a regulating crank operated by the driving crank and operative on the arm to cause the speed thereof to be the same in corresponding parts of its strokes in opposite directions.

7. The combination of a driving shaft turning in one direction; a driven shaft; a gear; a crank turned by the driving shaft; a pivoted arm having a rack thereon meshing with said gear; means for transmitting motion from the crank to said arm, including a device for causing the speed of the latter to be the same in corresponding parts of its strokes in opposite directions; and a clutch for connecting the driven shaft at will either to the driving shaft directly or to said gear.

8. The combination with the driving shaft of a knitting machine of means for turning said shaft first in one direction and then in the other direction, the same including an oscillatory arm; a crank for oscillating said arm; and means for causing the speed of the arm to be the same in corresponding parts of its strokes in opposite directions.

ELMER U. AMES.

Copies of this patent may be obtained for five cents each, by addressing the "Commissioner of Patents, Washington, D. C."